United States Patent
Koopferstock et al.

(10) Patent No.: US 9,893,804 B1
(45) Date of Patent: Feb. 13, 2018

(54) CREDIT BASED APPROACH TO OPTIMIZING OPTICAL TRANSMISSION

(71) Applicants: Eric Koopferstock, Plano, TX (US); Daniel Bihon, Allen, TX (US)

(72) Inventors: Eric Koopferstock, Plano, TX (US); Daniel Bihon, Allen, TX (US)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 15/263,042

(22) Filed: Sep. 12, 2016

(51) Int. Cl.
*H04B 10/079* (2013.01)
*H04J 14/02* (2006.01)

(52) U.S. Cl.
CPC ...... *H04B 10/07953* (2013.01); *H04J 14/021* (2013.01); *H04J 14/0221* (2013.01)

(58) Field of Classification Search
CPC .............. H04B 10/07953; H04B 10/00; H04B 10/0799; H04J 14/0221; H04J 14/021; H04J 14/02
See application file for complete search history.

(56) References Cited

U.S. PATENT DOCUMENTS

| | | | |
|---|---|---|---|
| 6,115,157 A * | 9/2000 | Barnard | H04J 14/0221 398/1 |
| 9,166,888 B1 | 10/2015 | Brockbank et al. | |
| 2003/0161633 A1 | 8/2003 | Oki et al. | |
| 2003/0198227 A1 | 10/2003 | Matsuura et al. | |
| 2007/0263544 A1 | 11/2007 | Yamaanaka et al. | |
| 2013/0315580 A1 | 11/2013 | Boertjes et al. | |
| 2016/0192042 A1* | 6/2016 | Mitchell | H04Q 11/0005 398/48 |

OTHER PUBLICATIONS

Office Action for U.S. Appl. No. 15/263,076, dated Aug. 31, 2017; 8 pages.

* cited by examiner

*Primary Examiner* — Ted Wang
(74) *Attorney, Agent, or Firm* — Baker Botts L.L.P.

(57) ABSTRACT

Methods and systems may implement a credit based approach for optimizing optical transmission and calculating optical paths in optical networks.

20 Claims, 7 Drawing Sheets

CREDIT BASED APPROACH TO OPTIMIZING OPTICAL TRANSMISSION

BACKGROUND

Field of the Disclosure

The present disclosure relates generally to optical communication networks and, more particularly, to a credit based approach to optimizing optical transmission.

Description of the Related Art

Telecommunications systems, cable television systems and data communication networks use optical networks to rapidly convey large amounts of information between remote points. In an optical network, information is conveyed in the form of optical signals through optical fibers. Optical networks may also include various subsystems, such as amplifiers, dispersion compensators, multiplexer/demultiplexer filters, wavelength selective switches, spectral inverters, couplers, etc. configured to perform various operations within the network.

The distance that an optical signal can be transmitted with optical amplifiers for a given data rate depends on the impairments in the transmission system. Typically, the higher the data rate and the denser the wavelength spacing, the more susceptible the transmission system is to impairments. Impairments can include accumulated amplified spontaneous emission (ASE) noise, chromatic dispersion (CD), nonlinear optical effects (such as nonlinear phase noise), polarization mode dispersion, and polarization dependent loss. Digital signal processing (DSP) in coherent optical receivers may compensate for linear impairments such as CD, polarization mode dispersion and polarization dependent loss effectively. Nonlinear phase noise (NLPN) may be mitigated by mid-span spectral inversion when the optical signal is transmitted across multiple spans.

Today wavelength division multiplexing (WDM) optical systems are based on providing the best transmission for each wavelength at each optical network node. In conventional optical networks, optical power may be shared among different optical paths, subject to each path spanning the same distance and having the same modulation type and optical signal-to-noise ratio (OSNR) or bit error rate (BER) limits. In active node systems, such as with reconfigurable optical add-drop multiplexer (ROADM) nodes with active equalization, it may be possible to further optimize transmission so that optical paths can perform in an improved manner.

SUMMARY

In one aspect, a method for path optimization in optical networks is disclosed. For a plurality of optical paths in an optical network, the optical paths each comprising a plurality of nodes and corresponding optical links between the nodes, and the optical paths each transmitting at least one optical channel, the method may include assigning credit values to each of the nodes for each of the optical paths, respectively, the credit values representing a range of optical power available at each node for each optical channel, respectively. The method may further include assigning an initial optical power to each of the nodes for each of the optical paths, respectively. Based on a BER measured for each of the optical channels, the method may further include redistributing credit values among the nodes to control redistributing optical power among the nodes. In the method, each node may be limited by the credit values to the range of optical power available at each node. The method may still further include, when excess credit values are available at a first node of the nodes, reducing a credit value at the first node to reduce the optical power applied at the first node, and, when additional credit values are indicated at the first node, increasing a credit value at the first node to increase the optical power applied at the first node.

In any of the disclosed embodiments of the method, redistributing credit values among the nodes may be performed for respective nodes transmitting at least two different optical paths to redistribute power among the different optical paths.

In any of the disclosed embodiments of the method, redistributing credit values among the nodes may be performed for nodes along a first optical path to redistribute power among the nodes in the first optical path.

In any of the disclosed embodiments of the method, redistributing credit values among the nodes may be performed for a first transmission direction along the optical paths independently of a second transmission direction opposing the first transmission direction.

In any of the disclosed embodiments of the method, an availability of excess credit values at the first node may be determined by a current credit value at the first node relative to the range of optical power, while an indication of additional credit values at the first node may be determined by the BER of the optical paths transmitted by the first node relative to a BER threshold value.

In any of the disclosed embodiments of the method, the method may further include at each of the nodes, for each optical path transmitted by the node, monitoring the credit values assigned to the node with respect to the range of credit values. Responsive to a request to redistribute credit values associated with the node, the method may include modifying the optical power applied at the first node according to the request, and, after modifying the optical power, reporting the credit value at the node.

In any of the disclosed embodiments of the method, redistributing the credit values may further include monitoring the BER for each optical path in the network, based on the BER for the optical path, sending at least one request to redistribute credit values to nodes associated with the optical path, and receiving reports of current credit values at each of the nodes for each of the optical paths.

In any of the disclosed embodiments of the method, the credit values may further include a cost metric as a weighting factor for a network resource associated with the nodes. In the method, the network resource may be selected from at least one of a data transmission capacity of a node, a channel capacity of a node, a cost per mile associated with a node, a network demand associated with a node at a given time, a number of optical links available to a node, and a network latency associated with a node.

In any of the disclosed embodiments of the method, the method may further include in the optical network generating the cost metric for the network resource based on a market value for the network resource.

In any of the disclosed embodiments of the method, the nodes may be wavelength division multiplexing nodes.

In another aspect, a network management system for path optimization in optical networks is disclosed. The network management system may include a processor enabled to access a memory media storing instructions executable by the processor. In the network management system, the instructions may be executable by the processor to, for a plurality of optical paths in an optical network, the optical paths each comprising a plurality of nodes and corresponding optical links between the nodes, and the optical paths each transmitting at least one optical channel, assign credit values to each of the nodes for each of the optical paths, respectively, the credit values representing a range of optical power available at each node for each optical channel, respectively. In the network management system, the instructions may further be executable to assign an initial optical power to each of the nodes for each of the optical paths, respectively. Based on a bit error rate (BER) measured for each of the optical channels, the instructions may also be executable to redistribute credit values among the nodes to control redistributing optical power among the nodes, wherein each node is limited by the credit values to the range of optical power available at each node. In the network management system, the instructions may further include instructions to, when excess credit values are available at a first node of the nodes, reduce credit values at the first node to reduce the optical power applied at the first node, and, when additional credit values are indicated at the first node, increase credit values at the first node to increase the optical power applied at the first node.

In any of the disclosed embodiments of the network management system, the instructions to redistribute credit values among the nodes may be executed for respective nodes transmitting at least two different optical paths to redistribute power among the different optical paths.

In any of the disclosed embodiments of the network management system, the instructions to redistribute credit values among the nodes may be executed for nodes along a first optical path to redistribute power among the nodes in the first optical path.

In any of the disclosed embodiments of the network management system, the instructions to redistribute credit values among the nodes may be performed for a first transmission direction along the optical paths independently of a second transmission direction opposing the first transmission direction.

In any of the disclosed embodiments of the network management system, an availability of excess credit values at the first node may be determined by a current credit value at the first node relative to the range of optical power, while an indication of additional credit values at the first node may be determined by the BER of the optical paths transmitted by the first node relative to a BER threshold value.

In any of the disclosed embodiments of the network management system, each of the nodes, for each optical path transmitted by the node, may be enabled to monitor the credit values assigned to the node with respect to the range of credit values. Responsive to a request to redistribute credit values associated with the node, each of the nodes may be further enabled to modify the optical power applied at the first node according to the request, and, after modifying the optical power, report the credit value at the node.

In any of the disclosed embodiments of the network management system, the instructions to redistribute credit values may further include instructions to monitor the BER for each optical path in the network, based on the BER for the optical path, send at least one request to redistribute credit values to nodes associated with the optical path, and receive reports of current credit values at each of the nodes for each of the optical paths.

In any of the disclosed embodiments of the network management system, the credit values may further include a cost metric as a weighting factor for a network resource associated with the nodes. In the network management system, the network resource may be selected from at least one of a data transmission capacity of a node, a channel capacity of a node, a cost per mile associated with a node, a network demand associated with a node at a given time, a number of optical links available to a node, and a network latency associated with a node.

In any of the disclosed embodiments of the network management system, the instructions may further include instructions to generate the cost metric for the network resource based on a market value for the network resource.

In any of the disclosed embodiments of the network management system, the nodes may be wavelength division multiplexing nodes.

BRIEF DESCRIPTION OF THE DRAWINGS

For a more complete understanding of the present invention and its features and advantages, reference is now made to the following description, taken in conjunction with the accompanying drawings, in which.

DESCRIPTION OF THE EMBODIMENTS

Figure 1:
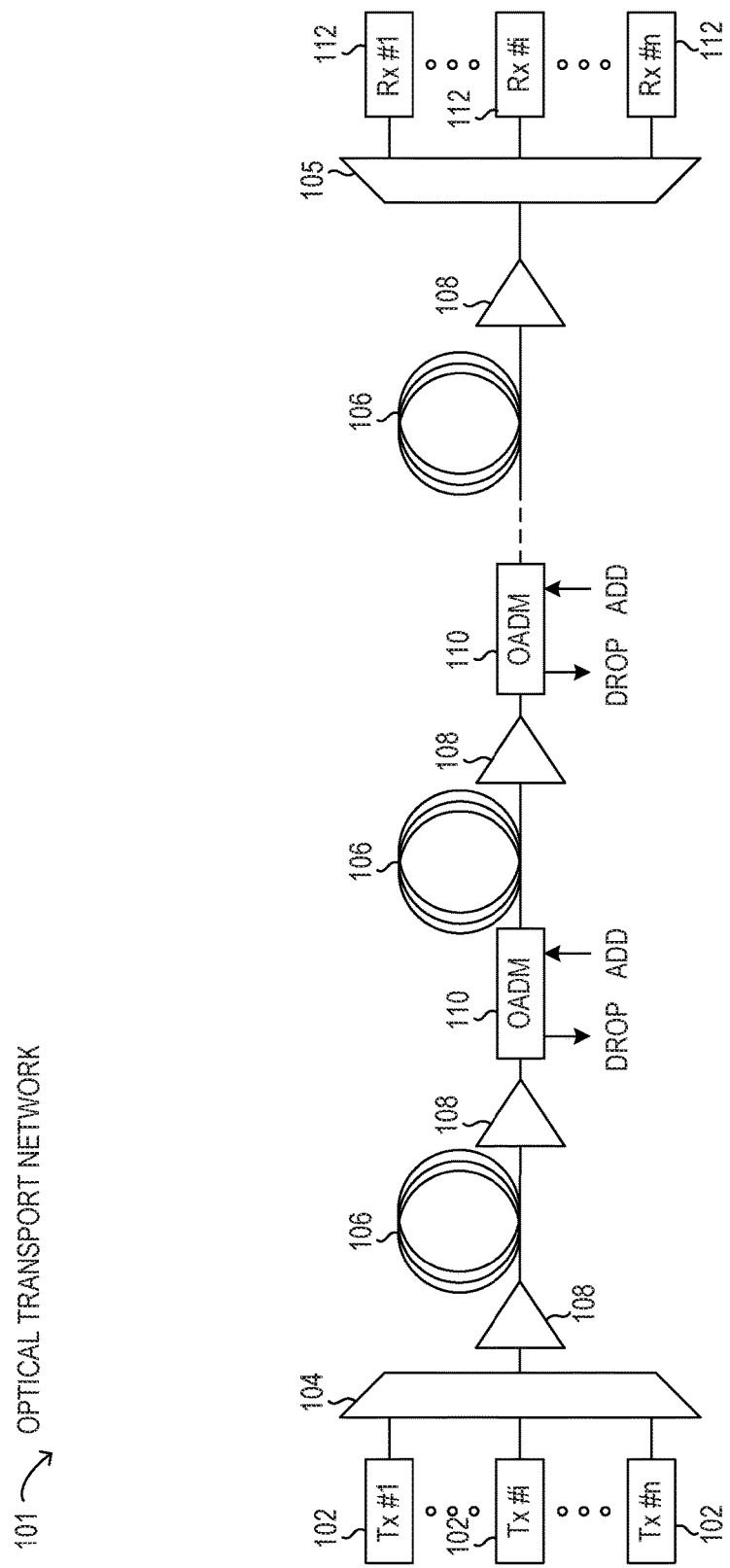
FIG. 1 is a block diagram of selected elements of an embodiment of an optical transport network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

As noted above, overcoming various network impairments and achieving better network performance has been proposed and implemented for several reasons, such as gain flattening, enhanced performance of preferred channels or channels with different modulation. Such techniques are largely based on improving distribution of optical amplifier power to the transmitted signals and channels. However, the distribution of optical amplifier power to transmitted signals and to individual channels is a global optical network optimization problem. Solutions to this global optical network optimization problem involving centralized management of optical power at each node and at each channel may involve a high degree of complexity that can render network operations inflexible, is difficult to scale to networks of different size and topology, and may not be economically feasible as a result.

As will be described herein in further detail, a credit based approach to optimizing optical transmission is proposed to optimize the distribution of amplifier power to optical signals. The credit based approach to optimizing optical transmission may be performed in real-time on active wavelength channels being transmitted over the optical network. The credit based approach to optimizing optical transmission may provide a general framework to implement various different kinds of control schemes, as will be described in further detail, to optimize various desired performance and cost factors in the optical network, including, but not limited to transmission performance, highest value transmission, best distribution based on traffic (or service-level agreements or bits carried or path distance), among other examples. The credit based approach to optimizing optical transmission may assign a value for the credit values used, while higher-level functions may be achieved by combining the values for the credit values with additional factors and metrics, to solve various different network problems, including path optimization and path computation in various contexts. In some embodiments, the credit based approach to optimizing optical transmission may be combined with external cost such as need for added hardware or network infrastructure.

For example, in conventional optical networks, optical signal power in a WDM system is generally treated as a nominal value and is uniformly distributed among the transmitted channels or nodes transmitting a channel. In the credit based approach to optimizing optical transmission, optical credit values may be created to represent a desired abstraction of the ability to improve signal quality, in a similar manner as a currency is an abstraction of goods and services in an economy.

The methods and system for a credit based approach to optimizing optical transmission disclosed herein may provide a mechanism to share optical power to the individual transmission conditions of individual optical channels. The methods and system for a credit based approach to optimizing optical transmission disclosed herein may be used without implementing feedback loops and without constant global monitoring over the optical network. The methods and system for a credit based approach to optimizing optical transmission disclosed herein may provide a de-centralized mechanism for effectively managing optical power across large optical networks with efficient use of network management and computational resources. The methods and system for a credit based approach to optimizing optical transmission disclosed herein may be used to improve and optimize an optical network over longer periods of time without affecting real-time activity within control loops that typically react quickly to network changes. The methods and system for a credit based approach to optimizing optical transmission disclosed herein may be realized using event-based functions and operations, thereby providing computational efficiency and scalability.

Referring now to the drawings, FIG. 1 illustrates an example embodiment of optical transport network (OTN) 101, which may represent an optical communication system. Optical transport network 101 included one or more optical fibers 106 to transport one or more optical signals communicated by components of optical transport network 101. The so-called 'nodes' of optical transport network 101, coupled together by fibers 106, may comprise one or more transmitters (Tx) 102, one or more multiplexers (MUX) 104, one or more optical amplifiers 108, one or more optical add/drop multiplexers (OADM) 110, one or more demultiplexers (DEMUX) 105, and one or more receivers (Rx) 112, among other network components linked together by fibers 106.

Optical transport network 101 may comprise a point-to-point optical network with terminal nodes, a ring optical network, a mesh optical network, or any other suitable optical network or combination of optical networks. Optical transport network 101 may be used in a short-haul metropolitan network, a long-haul inter-city network, or any other suitable network or combination of networks. The capacity of optical transport network 101 may include optical paths transmitting data at various rates, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a standard Single-Mode Fiber (SMF), Enhanced Large Effective Area Fiber (E-LEAF), or TrueWave® Reduced Slope (TW-RS) fiber.

Optical transport network 101 may include devices to transmit optical signals over optical fibers 106. Information may be transmitted and received through optical transport network 101 by modulation of one or more wavelengths of light to encode the information on the wavelength. In optical networking, a wavelength of light may also be referred to as a "channel" that is included in an optical signal. Each channel may carry a certain amount of information through optical transport network 101.

To increase the information capacity and transport capabilities of optical transport network 101, multiple signals transmitted at multiple channels may be combined into a single wide bandwidth optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical transport network 101 may transmit disparate channels using WDM or some other suitable multi-channel multiplexing technique, and to amplify the multi-channel signal.

Recently, advancements in DWDM enabled combining several optical carriers to create a composite optical signal of a desired capacity. One such example of a multi-carrier optical signal is a superchannel, which is an example of high spectral efficiency (SE) that may attain transmission rates of 100 Gb/s or higher. Thus, in a superchannel, subcarriers are tightly packed and consume less optical spectrum than conventional DWDM. Another distinctive feature of superchannels is that the subcarriers in a superchannel travel from the same origin to the same destination, and are not added or removed using an OADM while in transmission. Techniques for achieving high spectral efficiency (SE) in optical networks may include the use superchannels modulated using dual-polarization quadrature phase-shift keying (DP-QPSK) for long-haul transmission at data rates of 100 Gb/s or greater. In particular embodiments, Nyquist wavelength-division multiplexing (N-WDM) may be used in a super-channel. In N-WDM, optical pulses having a nearly rectangular spectrum are packed together in the frequency domain with a bandwidth approaching the Baud rate.

Optical transport network 101 may include one or more optical transmitters (Tx) 102 to transmit optical signals through optical transport network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical transport network 101.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical transport network 101. Optical amplifiers 108 may be positioned before and after certain lengths of fiber 106, which is referred to as "in-line amplification". Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of a pump signal to excite the atoms of the doped portion of the optical fiber, which increases the intensity of the optical signal. As an example, optical amplifiers 108 may comprise an erbium-doped fiber amplifier (EDFA). However, any other suitable amplifier, such as a semiconductor optical amplifier (SOA), may be used.

OADMs 110 may be coupled to optical transport network 101 via fibers 106. OADMs 110 comprise an add/drop module, which may include a system, apparatus or device to add and drop optical signals (i.e., at individual wavelengths) from fibers 106. After passing through an OADM 110, an optical signal may travel along fibers 106 directly to a destination, or the signal may be passed through one or more additional OADMs 110 and optical amplifiers 108 before reaching a destination. In this manner, OADMs 110 may enable connection of different optical transport network topologies together, such as different rings and different linear spans, which may result in a mesh network or a grid network.

In certain embodiments of optical transport network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM. In some embodiments, a WSS may be used in place of multiplexer 104 or demultiplexer 105.

Many existing optical networks are operated at 10 gigabit-per-second (Gbps) or 40 Gbps signal rates with 50 gigahertz (GHz) of channel spacing in accordance with International Telecommunications Union (ITU) standard wavelength grids, also known as fixed-grid spacing, which is compatible with conventional implementations of optical add-drop multiplexers (OADMs) and with conventional implementations of demultiplexers 105. However, as data rates increase to 100 Gbps and beyond, the wider spectrum requirements of such higher data rate signals often require increasing channel spacing. In traditional fixed grid networking systems supporting signals of different rates, the entire network system typically must be operated with the coarsest channel spacing (100 GHz, 200 GHz, etc.) that can accommodate the highest rate signals. This may lead to an over-provisioned channel spectrum for lower-rate signals and lower overall spectrum utilization.

Thus, in certain embodiments, optical transport network 101 may employ components compatible with flexible grid optical networking that enables specifying a particular frequency slot per channel. For example, each wavelength channel of a WDM transmission may be allocated using at least one frequency slot. Accordingly, one frequency slot may be assigned to a wavelength channel whose symbol rate is low, while a plurality of frequency slots may be assigned to a wavelength channel whose symbol rate is high. Thus, in optical transport network 101, ROADM 110 may be capable of adding or dropping individual or multiple wavelengths of a WDM, DWDM, or superchannel signal carrying data channels to be added or dropped in the optical domain. In certain embodiments, ROADM 110 may include or be coupled to a wavelength selective switch (WSS).

As shown in FIG. 1, optical transport network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical transport network 101 may transmit and carry a forty (40) channel DWDM signal. Demultiplexer 105 may divide the single, forty channel DWDM signal into forty separate signals according to the forty different channels. It will be understood that different numbers of channels or subcarriers may be transmitted and demultiplexed in optical transport network 101, in various embodiments.

In FIG. 1, optical transport network 101 may also include receivers 112 coupled to demultiplexer 105. Each receiver 112 may receive optical signals transmitted at a particular wavelength or channel, and may process the optical signals to obtain (demodulate) the information (data) that the optical signals contain. Accordingly, network 101 may include at least one receiver 112 for every channel of the network. At receiver 112, a data quality metric may be measured to characterize a transmitted channel. BER is a common data quality metric, but in some embodiments, OSNR or Q-factor may be used as data quality metrics, in place of BER.

Optical networks, such as optical transport network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

PSK and QAM signals may be represented using a complex plane with real and imaginary axes on a constellation diagram. The points on the constellation diagram representing symbols carrying information may be positioned with uniform angular spacing around the origin of the diagram. The number of symbols to be modulated using PSK and QAM may be increased and thus increase the information that can be carried. The number of signals may be given in multiples of two. As additional symbols are added, they may be arranged in uniform fashion around the origin. PSK signals may include such an arrangement in a circle on the constellation diagram, meaning that PSK signals have constant power for all symbols. QAM signals may have the same angular arrangement as that of PSK signals, but include different amplitude arrangements. QAM signals may have their symbols arranged around multiple circles, meaning that the QAM signals include different power for different symbols. This arrangement may decrease the risk of noise as the symbols are separated by as much distance as possible. A number of symbols "m" may thus be used and denoted "m-PSK" or "m-QAM."

Examples of PSK and QAM with a different number of symbols can include binary PSK (BPSK or 2-PSK) using two phases at 0° and 180° (or in radians, 0 and $\pi$) on the constellation diagram; or quadrature PSK (QPSK, 4-PSK, or 4-QAM) using four phases at 0°, 90°, 180°, and 270° (or in radians, 0, $\pi/2$, $\pi$, and $3\pi/2$). Phases in such signals may be offset. Each of 2-PSK and 4-PSK signals may be arranged on the constellation diagram. Certain m-PSK signals may also be polarized using techniques such as dual-polarization QPSK (DP-QPSK), wherein separate m-PSK signals are multiplexed by orthogonally polarizing the signals. Also, m-QAM signals may be polarized using techniques such as dual-polarization 16-QAM (DP-16-QAM), wherein separate m-QAM signals are multiplexed by orthogonally polarizing the signals.

Dual polarization technology, which may also be referred to as polarization division multiplexing (PDM), enables achieving a greater bit rate for information transmission. PDM transmission comprises simultaneously modulating information onto various polarization components of an optical signal associated with a channel, thereby nominally increasing the transmission rate by a factor of the number of polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

In certain embodiments, optical transport network 101 may transmit a superchannel, in which a plurality of subcarrier signals (or subchannels or channels) are densely packed in a fixed bandwidth band and may be transmitted at very high data rates, such as 400 Gb/s, 1 Tb/s, or higher. Furthermore, the superchannel may be well suited for transmission over very long distances, such as hundreds of kilometers, for example. A typical super-channel may comprise a set of subcarriers that are frequency multiplexed to form a single channel that are transmitted through optical transport network 101 as one entity. The subcarriers within the superchannel may be tightly packed to achieve high spectral efficiency.

In an optical network, such as optical transport network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network nodes). As an example, the management plane may consist of a central processing center (e.g., the central management host), including one or more processing resources, data storage components, etc. The management plane may be in electrical communication with the elements of the control plane and may also be in electrical communication with one or more network nodes of the transport plane. The management plane may perform management functions for an overall system and provide coordination between network nodes, the control plane, and the transport plane. As examples, the management plane may include an element management system (EMS) which handles one or more network nodes from the perspective of the elements, a network management system (NMS) which handles many devices from the perspective of the network, or an operational support system (OSS) which handles network-wide operations.

Modifications, additions or omissions may be made to optical transport network 101 without departing from the scope of the disclosure. For example, optical transport network 101 may include more or fewer elements than those depicted in FIG. 1. Also, as mentioned above, although depicted as a point-to-point network, optical transport network 101 may comprise any suitable network topology for transmitting optical signals such as a ring, a mesh, or a hierarchical network topology.

In operation, optical transport network 101 may include nodes and systems that implement a credit based approach to optimizing optical transmission, as disclosed herein.

Figure 2:
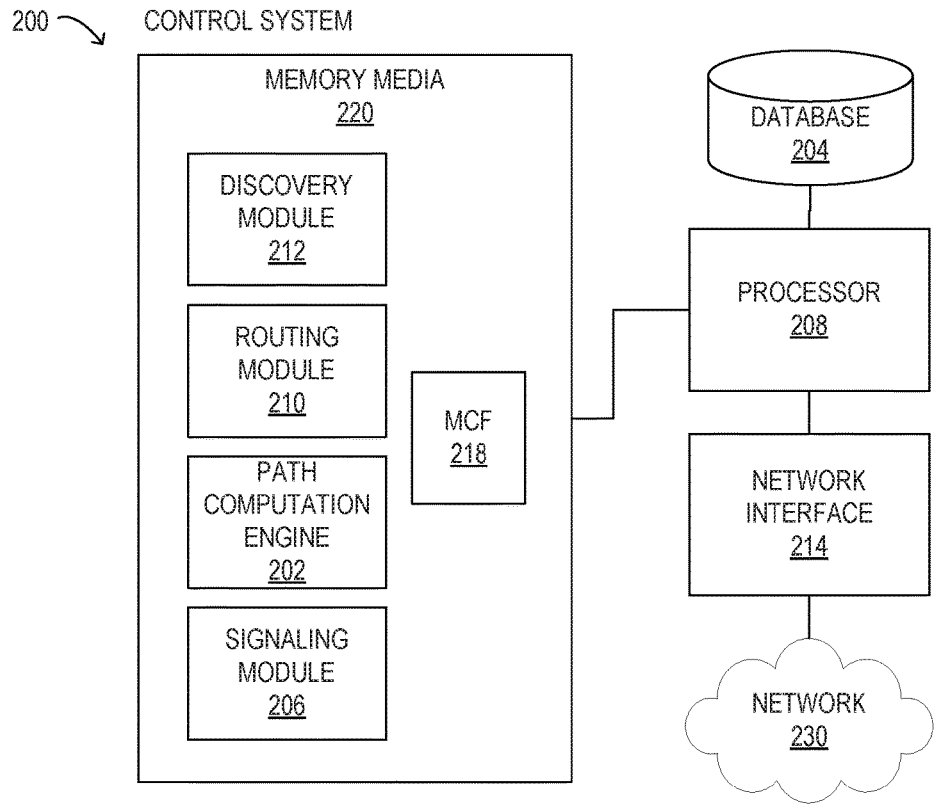
FIG. 2 is a block diagram of selected elements of an embodiment of an optical control plane system.

Referring now to FIG. 2, a block diagram of selected elements of an embodiment of control system 200 for implementing control plane functionality in optical networks, such as, for example, in optical transport network 101 (see FIG. 1), is illustrated. A control plane may include functionality for network intelligence and control and may comprise applications that support the ability to establish network services, including applications or modules for discovery, routing, path computation, and signaling, as will be described in further detail. In particular, control system 200 may represent at least certain portions of a network management system used to execute at least certain portions of the credit based approach to optimizing optical transmission disclosed herein.

In FIG. 2, the control plane applications executed by control system 200 may work together to automatically establish services within the optical network. Discovery module 212 may discover local links connecting to neighbors. Routing module 210 may broadcast local link information to optical network nodes while populating database 204. When a request for service from the optical network is received, path computation engine 202 may be called to compute a network path using database 204. This network path may then be provided to signaling module 206 to establish the requested service.

As shown in FIG. 2, control system 200 includes processor 208 and memory media 220, which may store executable instructions (i.e., executable code) that may be executable by processor 208, which has access to memory media 220. Processor 208 may execute instructions that cause control system 200 to perform the functions and operations described herein. For the purposes of this disclosure, memory media 220 may include non-transitory computer-readable media that stores data and instructions for at least a period of time. Memory media 220 may comprise persistent and volatile media, fixed and removable media, and magnetic and semiconductor media. Memory media 220 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory, non-transitory media, or various combinations of the foregoing. Memory media 220 is operable to store instructions, data, or both. Memory media 220 as shown includes sets or sequences of instructions that may represent executable computer programs, namely, path computation engine 202, signaling module 206, discovery module 212, routing module 210, and a management credit function (MCF) 218.

Also shown included with control system 200 in FIG. 2 is network interface 214, which may be a suitable system, apparatus, or device operable to serve as an interface between processor 208 and network 230. Network interface 214 may enable control system 200 to communicate over network 230 using a suitable transmission protocol or standard. In some embodiments, network interface 214 may be communicatively coupled via network 230 to a network storage resource. In some embodiments, network 230 represents at least certain portions of optical transport network 101. Network 230 may also include certain portions of a network using galvanic or electronic media. In certain embodiments, network 230 may include at least certain portions of a public network, such as the Internet. Network 230 may be implemented using hardware, software, or various combinations thereof.

In certain embodiments, control system 200 may be configured to interface with a person (a user) and receive data about the optical signal transmission path. For example, control system 200 may also include or may be coupled to one or more input devices and output devices to facilitate receiving data about the optical signal transmission path from the user and to output results to the user. The one or more input or output devices (not shown) may include, but are not limited to, a keyboard, a mouse, a touchpad, a microphone, a display, a touchscreen display, an audio speaker, or the like. Alternately or additionally, control system 200 may be configured to receive data about the optical signal transmission path from a device such as another computing device or a network node, for example via network 230.

As shown in FIG. 2, in some embodiments, discovery module 212 may be configured to receive data concerning an optical signal transmission path in an optical network and may be responsible for discovery of neighbors and links between neighbors. In other words, discovery module 212 may send discovery messages according to a discovery protocol, and may receive data about the optical signal transmission path. In some embodiments, discovery module 212 may determine features, such as, but not limited to: fiber type, fiber length, number and type of components, data rate, modulation format of the data, input power of the optical signal, number of signal carrying wavelengths (i.e., channels), channel spacing, traffic demand, and network topology, among others.

As shown in FIG. 2, routing module 210 may be responsible for propagating link connectivity information to various nodes within an optical network, such as optical transport network 101. In particular embodiments, routing module 210 may populate database 204 with resource information to support traffic engineering, which may include link bandwidth availability. Accordingly, database 204 may be populated by routing module 210 with information usable to determine a network topology of an optical network.

Path computation engine 202 may be configured to use the information provided by routing module 210 to database 204 to determine transmission characteristics of the optical signal transmission path. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), and amplified spontaneous emission (ASE), among others, may affect optical signals within the optical signal transmission path. To determine the transmission characteristics of the optical signal transmission path, path computation engine 202 may consider the interplay between the transmission degradation factors. In various embodiments, path computation engine 202 may generate values for specific transmission degradation factors. Path computation engine 202 may further store data describing the optical signal transmission path in database 204.

In FIG. 2, signaling module 206 may provide functionality associated with setting up, modifying, and tearing down end-to-end networks services in an optical network, such as optical transport network 101. For example, when an ingress node in the optical network receives a service request, control system 100 may employ signaling module 206 to request a network path from path computation engine 202 that may be optimized according to different criteria, such as bandwidth, cost, etc. When the desired network path is identified, signaling module 206 may then communicate with respective nodes along the network path to establish the requested network services. In different embodiments, signaling module 206 may employ a signaling protocol to propagate subsequent communication to and from nodes along the network path.

Figure 4:
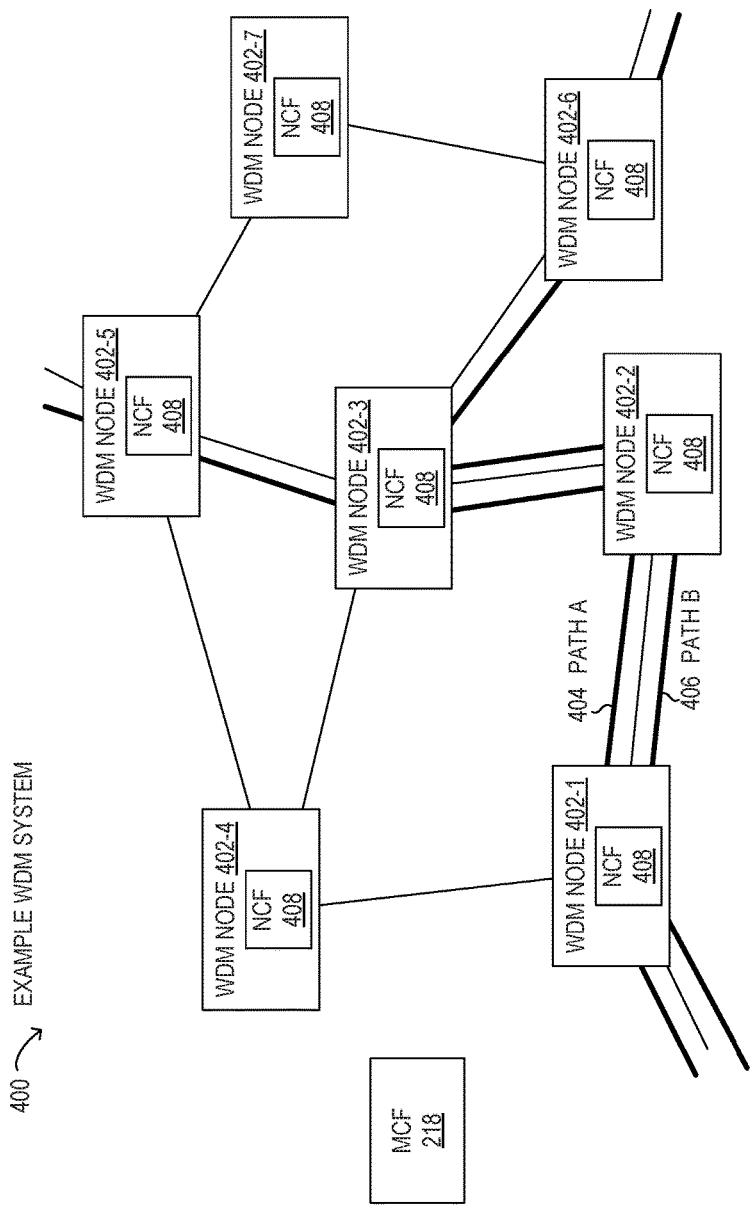
FIG. 4 is a network diagram of selected elements of an embodiment of an example WDM system.

In operation of control system 200, management credit function (MCF) 218 for power allocation decisions and business system integration as a network-level function may implement the credit based approach to optimizing optical transmission disclosed herein (see also FIG. 4). It is noted that in some embodiments, MCF 218 may be integrated, entirely or in part, within path computation engine 202, for example, to provide functionality for evaluating and determining candidate paths for a given pair of source and destination nodes in an optical network, such as optical transport network 101 in FIG. 1. Furthermore, it is noted that control system 200 may function as, or may further include, a software-defined networking (SDN) controller.

Figure 3:
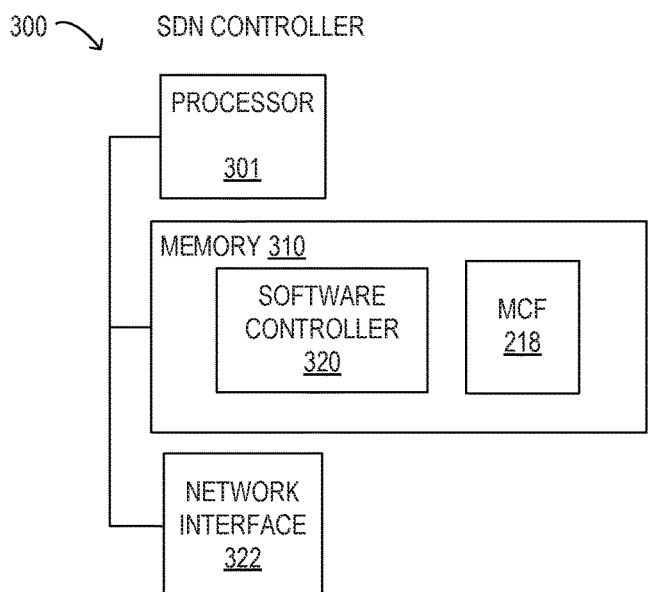
FIG. 3 is a block diagram of selected elements of an embodiment of a software-defined networking (SDN) controller.

Referring now to FIG. 3, a block diagram of selected elements of an embodiment of SDN controller 300 is illustrated. SDN controller 300 in FIG. 3 may be implemented to control optical network 101 (see FIG. 1) and is a schematic diagram for descriptive purposes. SDN controller 300 may represent at least certain portions of a network management system used to execute at least certain portions of the credit based approach to optimizing optical transmission disclosed herein.

In FIG. 3, SDN controller 300 is represented as a computer system including physical and logical components for controlling optical network 101, as described herein, and may accordingly include processor 301, memory 310, and network interface 322. Processor 301 may represent one or more individual processing units and may execute program instructions, interpret data, process data stored by memory 310 or SDN controller 300. It is noted that SDN controller 300 may be implemented in different embodiments. For example, in some embodiments, SDN controller 300 may be implemented using a network node. In particular embodiments, memory 310 may store executable instructions in the form of a software controller 320 executing on processor 301. Additionally, memory 310 may store MCF 218 for power allocation decisions and business system integration as a network-level function to implement the credit based approach to optimizing optical transmission disclosed herein (see also FIG. 4).

In FIG. 3, memory 310 may be communicatively coupled to processor 301 and may comprise a system, device, or apparatus suitable to retain program instructions or data for a period of time (e.g., computer-readable media). Memory 310 may include various types components and devices, such as random access memory (RAM), electrically erasable programmable read-only memory (EEPROM), a PCMCIA card, flash memory, solid state disks, hard disk drives, magnetic tape libraries, optical disk drives, magneto-optical disk drives, compact disk drives, compact disk arrays, disk array controllers, or any suitable selection or array of volatile or non-volatile memory. Non-volatile memory refers to a memory that retains data after power is turned off. It is noted that memory 310 may include different numbers of physical storage devices, in various embodiments. As shown in FIG. 3, memory 310 may include software controller 320, among other applications or programs available for execution.

Some non-limiting examples of external applications that may be used with SDN controller 300 include orchestrators (NCX, Anuta Networks, Inc., Milpitas, Calif., USA; Exanova Service Intelligence, CENX, Ottawa, Canada), workflow managers (Salesforce Service Cloud, salesforce.com, Inc., San Francisco, Calif., USA; TrackVia, TrackVia, Inc., Denver, Colo., USA; Integrify, Integrify Inc., Chicago, Ill., USA); and analytics applications (Cloud Analytics Engine, Juniper Networks, Inc., Sunnyvale, Calif., USA; Nuage Networks Virtualized Services Directory (VSD), Nokia Solutions and Networks Oy, Espoo, Finland).

Referring now to FIG. 4, a network diagram of selected elements of an embodiment of an example WDM system 400 (or simply 'WDM system 400'). In WDM system 400, a network diagram showing a plurality of WDM nodes 402 with various optical links between them is illustrated. FIG. 4 is a schematic diagram and is not drawn to scale. Additionally, two optical networking paths, path A 404 and path B 406 are shown traversing through WDM system 400. It will be assumed that path A 404 and path B 406 have been provisioned along the depicted WDM nodes 402 and that the credit based approach to optimizing optical transmission will be applied to WDM system 400, as described in further detail below.

As noted previously, in conventional optical networks, when an optical path is provisioned the optical signal power that is applied to the optical path is generally assumed to be a nominal value that is equally distributed among the nodes along the optical path. However, the optical power used to obtain a given BER (or another data quality metric) for an optical path of a given length may be distributed unevenly among the nodes that comprise the optical path, as long as the total optical signal power relative to the noise measured at the receiver remains constant. This fact provides one basis for the credit based approach to optimizing optical transmission disclosed herein. Furthermore, the nominal value for optical power that is typically used in conventional optical networks may be more than sufficient, or may be excessive, for actual path lengths and for the number of nodes along actual paths. In other words, optical power along many conventional optical network paths may be safely reduced without any degradation of data quality, as evidenced by the data quality metric measured at the receiver. Thus, it may be assumed that optical power is available for improved redistribution among channels and optical paths at nodes in optical networks. This fact provides another basis for the credit based approach to optimizing optical transmission disclosed herein.

For example, as noted previously, different modulation formats may be used to transmit different numbers of channels at different effective data rates. However, the optical power consumed by different modulation formats may vary, with higher symbol-density modulation formats consuming higher levels of optical power, while lower symbol-density modulation formats being able to consume lower levels of optical power. The credit based approach to optimizing optical transmission disclosed herein may resolve issues in a multi-modulation network by sharing power in a manner that is optimized for distance reach. In an optimal optical transmission configuration, every optical link between nodes would have the same distance and provide the same optical impairments per optical link. Thus, at nominal power, for example, up to 22 optical links may be reached. In one example, if credit consumption (and thus, optical power) was reduced to 0 credit values/node from an allocated 30 credit values/node, the reach may be reduced to about 11 optical links.

In many current optical networks, QPSK is a standard modulation format, while 8QAM and 16QAM, among other modulation formats, are also supported. Because QAM has a shorter reach, when QAM-based modulation formats are used, additional credit values will be consumed, as compared with QPSK. Assuming the previous optical transmission configuration used QPSK with 0 credit values/node, the corresponding optical transmission configuration using 8QAM modulation may consume 12 credit values/node, while 16QAM modulation may consume 23 credit values/node, assuming the same transmission distance. Thus, the credit based approach to optimizing optical transmission disclosed herein may enable more efficient combinations of modulation formats to populate available channels with different modulation formats, to the extent that credit values are available at each node.

Assuming that an optical power of X dB per channel is used for the optical node having N number of channels, credit values may be defined and assigned and redistributed using various methods for the optical path. As described herein, it will be assumed that one (1) credit value is assigned to 0.1 dB increments of optical power. It will also be assumed herein that optical amplifiers at each node in the optical path operate in a linear range of optical power from −3 dB to +3 dB from a nominal optical power. These assumptions may be globally defined and used across the optical network where the credit based approach to optimizing optical transmission is used. It will be understood that different values for the credit value increment in optical power and the range of optical power, including non-linear ranges, may be used in various embodiments. Based on the above assumptions for credit value assignments, different ranges of optical power scaling per channel may be used in different embodiments.

In one exemplary embodiment, the overall optical power may not be constrained for the given channels in an optical path, such as when the number of channels is relatively small as compared to the capacity of a node in the optical network. In this embodiment, a minimum optical power may be defined as X−3 dB=−30 credit values for each channel, the nominal optical power may be defined as X dB=0 credit values for each channel, and a maximum optical power may be defined as X+3 dB=+30 credit values for each channel. In this embodiment, each channel may be assigned 30 credit values and all channels may be initially added (i.e., provisioned) at the nominal optical power value. Then, credit values may be subsequently added or removed from each individual channel within the given range to redistribute optical power according to various methods. For example, when a given channel operates at less than the nominal optical power, credit values may be refunded for that channel and used for other channels.

In another exemplary embodiment, the number of channels may be relatively large (as compared to the overall capacity of a node in the optical network) and the overall optical power at the node may become constrained. In this embodiment, the credit based approach to optimizing optical transmission may be used to optimize the allocation of the total optical power in the optical network. Thus, the minimum optical power may be defined as X−3 dB=0 credit values for each channel, the nominal optical power may be defined as X dB=+30 credit values for each channel, and the maximum optical power may be defined as X+3 dB=+60 credit values for each channel. Then, a determination may be made about how many credit values are actually allocated per node, which creates or defines an overall supply of credit values for redistribution. The allocation or creation of credit values per node may be implemented on a per channel basis. In this embodiment, new channels may be added at the minimum optical power corresponding to 0 credit values, while each channel is allocated 30 credit values at a given node, such that a maximum of (N×30) credit values are allocated at each node. As each channel is added and begins to transmit data, the power level for each channel may be increased using the assigned credit values, for example to attain a specified level for the data quality metric observed at the receiver. To the extent that optical power at a node is used at less than the nominal optical power for a given channel, the credits allocated to that channel may be used by another channel at the node. In this manner, optical power may be redistributed among different channels at a node using the credit based approach to optimizing optical transmission.

In other exemplary embodiments, optical power may be distributed among different nodes for a given channel along the optical path using the credit based approach to optimizing optical transmission. The redistribution of optical power among different nodes for a given channel along the optical path may be used, for example, to alleviate congestion at a given node, based on the fact that the optical power applied to a given channel can be non-uniformly distributed along the optical path.

In WDM system 400, a hierarchical distribution of functionality may be defined for the credit based approach to optimizing optical transmission, comprising a node credit function (NCF) 408 for credit validation and optical power provisioning at each node, and a management credit function (MCF) 218 for power allocation decisions and business system integration as a network-level function.

NCF 408 may comprise an algorithm that calculates the number of credit values available and validates and executes a request to allocate credit values or a request to return credit values. For example, NCF 408 may control one or more optical amplifiers at the node based on the current credit value. NCF 408 may model the physical ability of a node to provide credit values based on a real world model of what the node's physical components can provide. NCF 408 may also model more complex rules based upon measured performance of the amplifier in the node, aging rules, as well as traffic-aware rules based on existing network traffic at the node. For example, rules implemented by NCF 408 may include various rules, such as in order to not to exceed the total power available, or to comply with adjacent channel power rules, among other limitations and conditions for operability in the optical network.

NCF 408 may be installed and executed at each node in the optical network, as illustrated in system 400, to implement the credit based approach to optimizing optical transmission disclosed herein. Although the actual executable code comprising NCF 408 may be the same, it will be understood that each run-time instance of NCF 408 depicted in FIG. 4 is an independently executing instance having individual memory contents and execution states that are specific to a particular instance of WDM node 402, as depicted. Once activated, NCF 408 may assume responsibility for optical power management at each node, and NCF 408 may be locally aware of the hardware capabilities at each node, such as a number of degrees, number of optical amplifiers, as well as the optical power capabilities of each optical amplifier. The responsibility for optical power management may be exclusive to NCF 408, which may operate to control steady-state optical power, or quasi-steady-state optical power, rather than respond to extreme or sudden optical power transients. NCF 408 may communicate with MCF 218 to receive instructions, credit value settings and other information from MCF 218, and to send actual power value settings and other information to MCF 218.

MCF 218 may be an allocation function that queries the network for data quality metrics of the optical path, for example, such as BER among other examples. MCF 218 may also request credit values from NCF 408 or return credit values to NCF 408. MCF 218 may be implemented in a decentralized manner and may operate for a single channel at a time, for example. MCF 218 may be implemented in a centralized manner with optimizations across single channels, or multiple channels, for example. In some implementations, MCF 218 may be implemented in a mixed environment where both centralized and decentralized aspects coexist, such as using a plurality of SDN controllers 300, or a combination of SDN controller 300 and control plane 200. In given embodiments, MCF 218 may include functionality for lowest cost optimization, validation against data quality metrics, as well as verify, retry, and reallocation functions.

In various embodiments, MCF 218 may include functionality to maintain costs for credit values in use in the system, when factoring of cost metrics is used. In one embodiment, MCF 218 may include functionality for maintaining the cost metrics associated with credit values, such as cost metrics for network usage, physical network resources, or for various associated resources. The network resource may be selected from at least one of a data transmission capacity of a node, a channel capacity of a node, a cost per mile associated with a node, a network demand associated with a node at a given time, a number of optical links available to a node, and a network latency associated with a node. As such, the cost metric may be a tool used to manage scarcity of network resources, such as to alleviate network congestion. In particular embodiments, MCF 218 may calculate and assign cost metrics based on a market value of a given service or network resource. The market value may vary on a demand basis with higher costs associated with higher density (traffic or physical), higher cost per mile, real time actual demand, among other market factors. In some network environments, such functionality may already be present and MCF 218 may be adapted to include, or access, existing business support systems (BSS) modules or related functionality.

In WDM system 400, the amount of optical power allocated per channel affects the OSNR (or other data quality metric) for that channel. Under so-called flat operations, or fixed gain tilt, each channel may have a nominal optical power assigned to the channel. Using the credit based approach to optimizing optical transmission, the nominal optical power may be adjusted, or redistributed, using a number of increments of the credit value for the channel. Even though the adjustment may be a relatively small amount, the overall result may be useful or beneficial in managing optical power across the overall optical network.

In operation of WDM system 400, first an optical path is provisioned, and as traffic is added to the optical path, the optical power may be set to a given level of optical power at each node along the optical path. The given level of optical power may be the minimum optical power, or the nominal optical power, in various embodiments. Once the optical path has been established, a data quality metric may be measured at the receiver of the optical path. As noted, BER is a common data quality metric, but in some embodiments, OSNR or Q-factor may be used as data quality metrics. The resulting measurement of the data quality metric may be better or worse than some desired threshold value, such as a specification of a maximum allowable BER, in one example, that a customer has been promised in a service-level agreement (SLA). The threshold value may also be associated with data quality metrics determined by constraints in the optical network itself. If the data quality measurement is better than the threshold value, then credit values may be returned to certain nodes, allowing for the optical power to be reduced at such nodes, subject to verification that the overall BER still remains within the desired tolerance. If the data quality measurement is worse than the threshold value, then credit values may be spent by certain nodes, allowing for the optical power to be increased at such nodes. Such a redistribution of the credit values may be subject to specific rules associated with each of the nodes, such as in order to not to exceed the total power available, or to comply with adjacent channel power rules, among other limitations and conditions for operability in the optical network, as noted previously.

As a result of the foregoing, each credit value at each node may be associated with an improvement in the accumulated noise contribution at the node. For example, if a signal needed an additional 0.5 dB improvement in OSNR to reach a destination, then about 5 credit values (5×0.1 dB) would be given to each node to increase optical power. Due to the way noise accumulates, credit values are used all along the optical path. If the path was comprised of 10 nodes, 5 credit values could be requested from every node in the path, for a total of 50 credit values that are obtained in a uniform manner along the optical path. However noise is cumulative, and an accumulation of approximately 50 credit values may also be non-uniformly distributed along the optical path in the network with about the same net effect. It is noted that other conditions may also be mitigated in a similar manner, and the distribution of optical power may be more advantageous in one particular node rather than another node, such that different particular algorithms may be used to adjust the distribution of network resources in an optimal manner.

The credit values may also be used as a control mechanism for providing the maximum number of credit values to be consumed by other traffic, which may be useful in multi-modulation type optical networks where different channels may use different levels of optical power to achieve certain BER thresholds. The credit value control mechanism may be used for limiting optical power in circuits that have short or relatively uncomplicated optical paths. When a cost metric is applied to the credit values, a cost measure may be generated to assess the difficulty of reaching a particular destination, or as a budget metric to measure remaining capacity in a system, or to create or evaluate least-cost routing of optical paths.

In FIG. 4, an example is described for two optical paths, path A 404 and path B 406, each path having a single optical channel. In this case, it may be assumed that the overall optical power is not constrained and that each path is initially set up at the nominal optical power corresponding to 0 credit values.

In FIG. 4, path A 404 is shown having been provisioned along WDM nodes 402-1, 402-2, 402-3, and 402-5, while path B 406 is shown having been provisioned along WDM nodes 402-1, 402-2, 402-3, and 402-6. Thus, path A 404 and path B 406 share WDM nodes 402-1, 402-2, and 402-3, where the credit based approach to optimizing optical transmission may be applied to share optical power between path A 404 and path B 406. For the purposes of describing WDM system 400, it will be assumed that path A 404 and path B 406 are each comprised of a single optical channel. Furthermore, no cost metric is applied in the example using WDM system 400. NCF 408 may be executed at each WDM node 402, and MCF 218 may represent execution at a network controller (not shown).

Thus, as path A 404 and path B 406 are provisioned, the nominal optical power may initially be set at each node, and WDM nodes 402-1, 402-2, and 402-3. The initial optical power may correspond to 0 credit values in the credit scaling used for this example. Then, MCF 218 may monitor the BER measurements for path A 404 and path B 406 and may find that path A 404 initially has a BER below the BER threshold value, while path B 406 has a BER above the BER threshold value. Then MCF 218 may determine the power state of path A 404 and may determine that credit values are available to increase the optical power. MCF 218 may monitor and keep track of the credit values allocated and consumed for each optical path in the optical network, for example, using database 204.

Because credit values are available, MCF 218 may accordingly send requests to increase optical power to NCF 408 at each of respective WDM nodes 402-1, 402-2, and 402-3. The requests to increase optical power may be sent as instructions or commands by MCF 218 to spend a specified number credit values to NCF 408. In response to receiving the instructions by MCF 218, NCF 408 may locally perform low-level hardware programming to command an optical amplifier to adjust output power according to the credit values specified in the instructions from MCF 218.

As a result, WDM node 402-1 gets +3 credit values (or spends +3 credit values) to increase optical power for path A 404, while WDM nodes 402-2 and 402-3 each get +2 credit values to increase optical power for path A 404. Then it may be determined by MCF 218 with a subsequent BER measurement that path A 404 has a BER below the threshold value. MCF 218 may also determine that the BER of path B 406 has sufficient margin that optical power may be reduced and still remain below the BER threshold value. As a result, MCF 218 sends requests to decrease optical power to WDM nodes 402-1, 402-2, and 402-3. As a result, each of WDM nodes 402-1, 402-2, and 402-3 gets −1 credit values (or has 1 credit value taken away) to reduce optical power to path B 406. Accordingly, NCF 408 at each of WDM nodes 402-1, 402-2, and 402-3 receives a command from MCF 218 to reduce 1 credit value, and NCF 408 performs the hardware programming to reduce optical power by this specified amount. NCF 408 may then confirm successful execution of the command to MCF 218. After subsequent monitoring of the BER of path B 406 by MCF 218, and a determination that the BER is below the BER threshold, the credit value redistribution scheme may end and steady state network operations may begin. At periodic intervals, the BER of path A 404 and path B 406 may be monitored and further redistributions of power may be made as changes in BER are observed.

Figure 5:
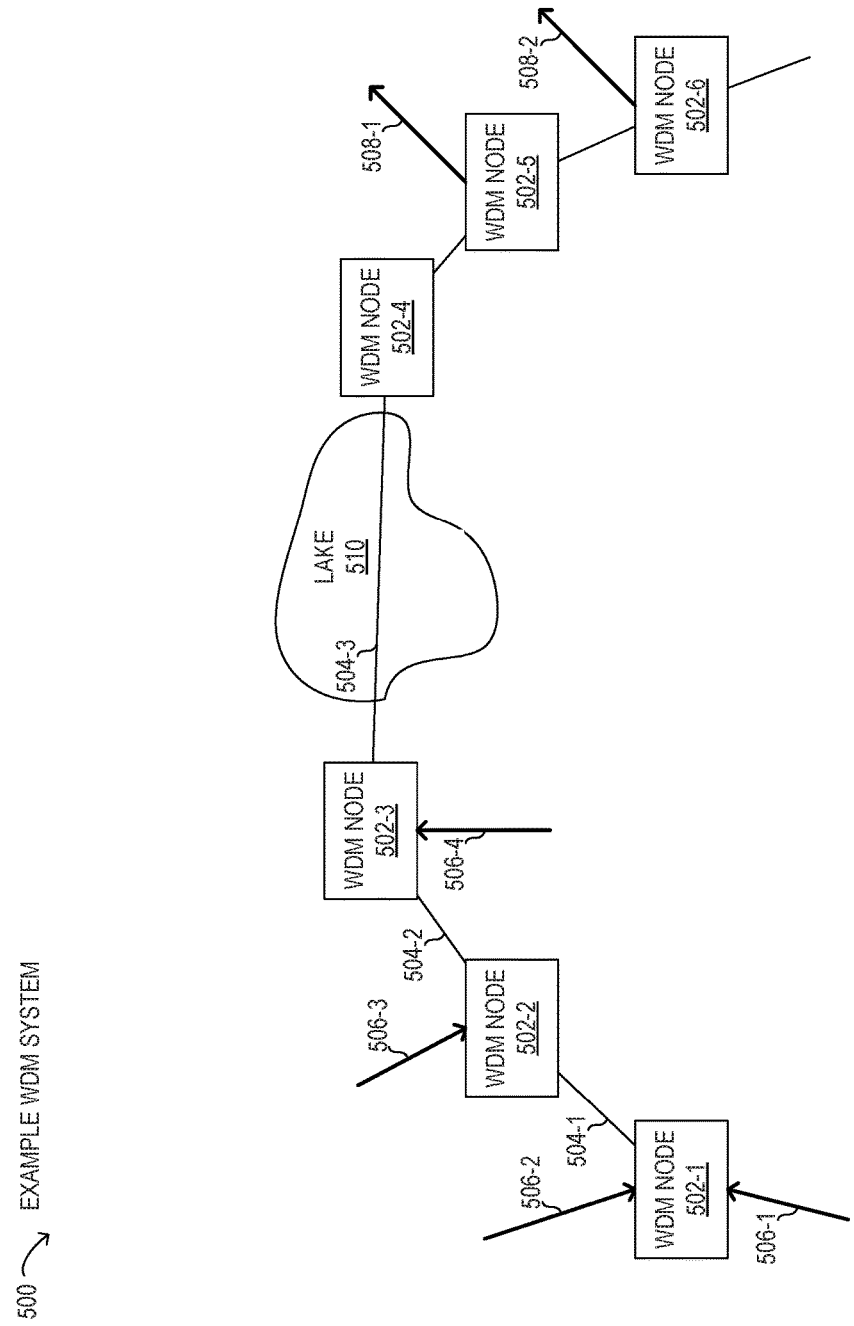
FIG. 5 is a network diagram of selected elements of an embodiment of an example WDM system.

Referring now to FIG. 5, a network diagram of selected elements of an embodiment of an example WDM system 500 (or simply 'WDM system 500'). In WDM system 500, a network diagram showing a plurality of WDM nodes 502 in a linear arrangement is shown with a lake 504 in the center of the optical path. FIG. 5 is a schematic diagram and is not drawn to scale. It will be assumed that a single optical path spans across the WDM nodes 502, with arrows 506 representing the addition of 20 channels, and arrows 508 representing the removal of 20 channels from the optical path at respective WDM nodes 502. The credit based approach to optimizing optical transmission will be applied to WDM system 500 to redistribute credit values along a single optical path, as described in further detail below. In system 500, it will be assumed that NCF 408 executes at each node 502, and communicates with MCF 218 executing at a network controller, in a similar manner as described above with respect to FIG. 4.

As described herein, credit values may be used to redistribute and reduce the optical load on certain WDM nodes 502, resulting in a redistribution of power among the nodes. In FIG. 5, it will be assumed that 1 credit value=0.1 dB of optical power, and that each WDM node 502 has a range of 60 credit values over which optical power can be adjusted. It will also be assumed that each channel has been allocated 30 credit values at each WDM node 502, which is physically dimensioned to transmit up to N=90 channels such that a maximum of 2,700 credit values have been allocated by MCF 218 to each node 502 (90 channels/node×30 credit values/channel=2,700 credit values/node). Then, for example, let each arrow 506 represent optical paths that add 20 channels to a respective node 502, while each arrow 508 represents optical paths that remove 20 channels from a respective node 502, as shown. Furthermore, it will be assumed that each channel will actually consume 35 credits per node in order to satisfy the transmission criteria for a measured BER (or other data quality metric).

Thus, in WDM system 500, at WDM node 502-1, 40 channels may be added by optical paths 506-1 and 506-2; WDM node 502-2, 20 channels may be added by optical paths 506-3; and at WDM node 502-3, 20 channels may be added by optical paths 506-4. Accordingly, optical link 504-1 may transmit 40 channels, optical link 504-2 may transmit 60 channels, while optical link 504-3 may transmit 80 channels across lake 510. As a result of the optical transmission configuration, WDM node 502-1 may consume 1,400 credit values (35 credit values/channel×40 channels/node=1,400 credit values/node); WDM node 502-2 may consume 2,100 credit values (35 credit values/channel×60 channels/node=2,100 credit values/node); and WDM node 502-3 may consume 2,800 credit values (35 credit values/channel×80 channels/node=2,800 credit values/node). As traffic accumulates in WDM system 500, a long optical link 504-3 across a lake 510 may accumulates the most traffic, resulting in WDM node 502-3 reaching exhaustion of credit values the earliest, because the credit values available per node have been limited to 2,700 credit values. Thus, the traffic that is routed across WDM node 502-3 from paths 506-4 may become constrained, which is undesirable, because WDM node 502-3 has reached credit exhaustion.

At this point, when MCF 218 determines that WDM node 502-3 is reaching credit exhaustion, MCF 218 may analyze the optical transmission configuration, as described above, and may execute a redistribution of credit values among WDM nodes 502-1, 502-2, 502-3 under the assumption that optical power may be unevenly added to each optical path along during transmission to achieve the same result as adding optical power evenly, with respect to nodes along a transmission path. As a result, MCF 218 may instruct NCF 208 at WDM node 502-1 to consume 40 credit values for each of the 40 channels at WDM node 502-1, thereby increasing credit value consumption at WDM node 502-1 from 1,400 credit values/node to 1,600 credit values/node, which adds 5 credit values/node in addition to the 35 credit values/node that were originally consumed at WDM node 502-1. Then for those same 40 channels passing through WDM node 502-3, MCF 218 may instruct NCF 208 at WDM node 502-3 to reduce credit value consumption from 35 credit values/node to 30 credit values/node, corresponding to the 5 credit values these 40 channels were additionally allocated at WDM node 502-1. The 60 channels at WDM node 502-2 and the other 40 channels at WDM node 502-3 may remain with the original allocation of 35 credit values/node. As a result of the distribution, WDM node 502-1 now consumes 1,600 credit values (40 credit values/channel×40 channels/node=1,600 credit values/node); WDM node 502-2 remains unchanged at 2,100 credit values/node; and WDM node 502-3 now consumes 2,600 credit values (30 credit values/channel×40 channels/node+35 credit values/channel×40 channels/node=2,600 credit values/node), which is below the allocated limit of 2,700 credit values/node. As a result of the redistribution of credit values among the WDM nodes 502, the additional traffic may now be added at WDM node 502-3 and the optical transmission configuration is enabled as depicted and described, which is desirable.

In a similar manner as described above for WDM nodes 502-1, 502-2, 502-3, the traffic congestion at WDM node 502-4 may be alleviated by redistributing credit values from WDM node 502-4 to WDM node 502-5 or WDM node 502-6, to alleviate credit exhaustion at WDM node 502-4, which also transmits 80 channels. Since WDM node 502-5 transmits 60 channels and WDM node 502-6 transmit 40 channels, WDM nodes 502-5, 502-6 will have reserve capacity to absorb additional credit value consumption resulting from redistribution of credit values among nodes.

In an additional example of using WDM system 500 to redistribute credit values among nodes, cost metrics may be redistributed as a proxy for optical power along the single optical path. As noted above, as traffic accumulates in WDM system 500, WDM node 502-3 will reach credit exhaustion first if all credit values are weighted with the same cost metric. For instance, the above example may be understood with all credit values being equally weighted with a cost metric of 1. However, the cost metric may be adjusted per WDM node 502, such that WDM node 502-1 has a cost per credit value of 1, WDM node 502-2 has a cost per credit value of 2, and WDM node 502-3 has a cost per credit value of 3. In this manner, the cost of credit values is adjusted so that MCF 218 will preferentially use credit values at WDM node 502-2 over WDM node 502-3 and credit values at WDM node 502-1 over WDM node 502-2, in order to minimize overall cost. Such a cost metric factorization will have the effect of reducing demand for credit values where the demand would otherwise be the highest, thereby consuming credit values preferentially further away from the expected points of congestion. It is noted that an actual congestion-based pricing system may be combined with the redistribution based on credit values that would dynamically increase the price of credit values as actual consumption of the credit values increases, as measured at the WDM nodes 502.

Figure 6:
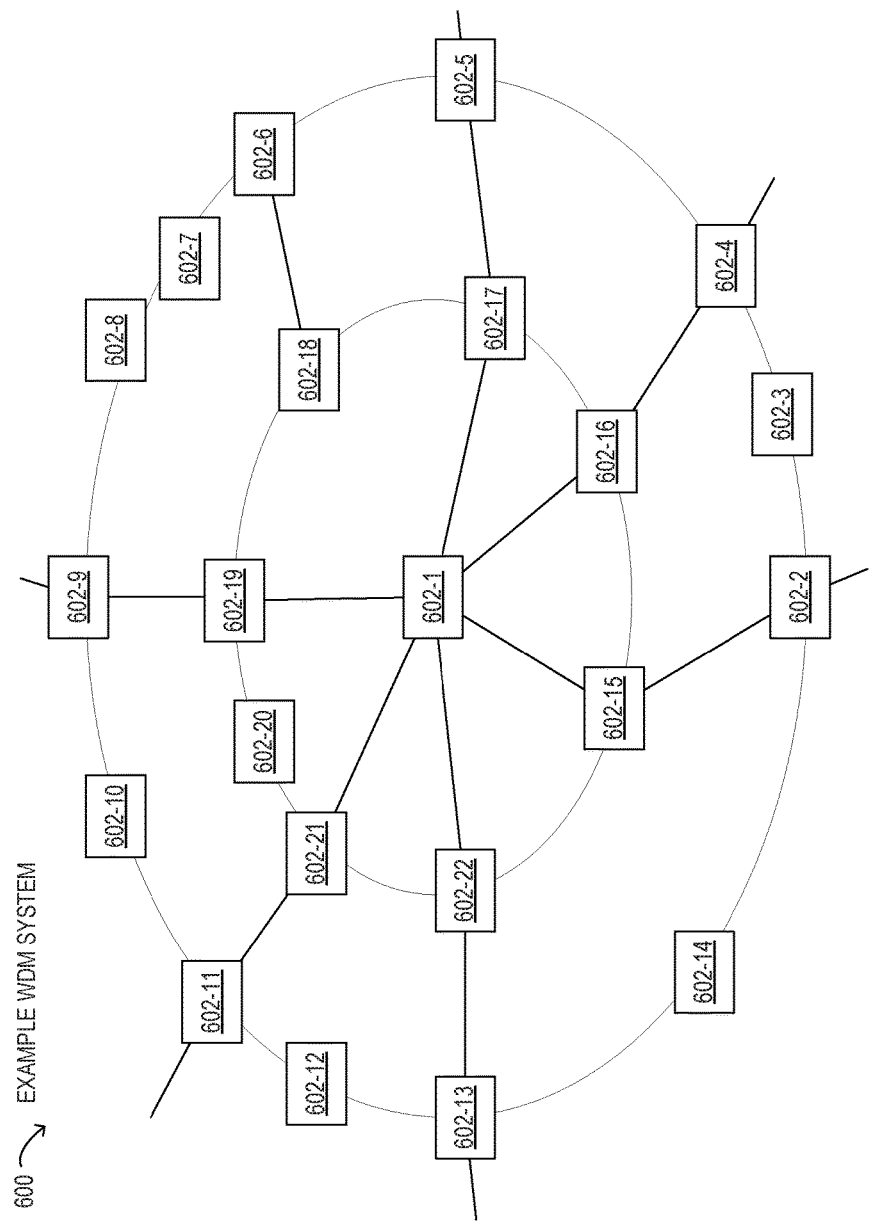
FIG. 6 is a network diagram of selected elements of an embodiment of an example WDM system.

Referring now to FIG. 6, a network diagram of selected elements of an embodiment of an example WDM system 600 (or simply 'WDM system 600'). In WDM system 600, a network diagram showing a plurality of WDM nodes 602-1 to 602-22 in an arrangement along two concentric rings, such as in a large metropolis, is depicted.

In one example of cost-based reoptimization of optical paths, three optical paths, paths C, D, E, may be provisioned in WDM system 600, as shown for the WDM nodes 602 listed in Table 1.

TABLE 1

Paths C, D, E in WDM system 600

| Path C | Path D | Path E |
|--------|--------|--------|
| 602-11 | 602-13 | 602-9  |
| 602-21 | 602-22 | 602-19 |
| 602-1  | 602-1  | 602-1  |
| 602-16 | 602-17 | 602-15 |
| 602-4  | 602-5  | 602-2  |

All paths C, D, E, traverse through central WDM node 602-1, where congestion occurs. In order to relieve congestion, a cost metric can be applied to the credit values so that distribution of network traffic can be optimized to achieve different aims. In this example the cost metric can be based on demand to reduce congestion. For example, when all WDM nodes 602 have the same cost metric (=1), the cost of all optical paths is the same (cost=5), so congestion will build up at WDM node 602-1. When a cost metric of 3 is applied to WDM node 602-1, paths C and D will have a cost=7, and may accordingly be recomputed to paths C* and D* having cost=6 and no longer passing through WDM node 602-1, as shown in Table 2. The reassignment of the cost metric may be performed by MCF 218, for example in conjunction with BSS, either in advance of the congestion, or after observing that the congestion has occurred.

TABLE 2

Recomputed Paths C*, D* in WDM system 600

| Path C* | Path D* |
|---------|---------|
| 602-11  | 602-13  |
| 602-21  | 602-14  |
| 602-22  | 602-2   |
| 602-15  | 602-3   |
| 602-16  | 602-4   |
| 602-4   | 602-5   |

In a more general example, WDM system 600 may be used to calculate network or customer cost, such as based on demand in the optical network and available connectivity.

The computation of the total path cost for three diverse optical paths F, G, H between WDM nodes 602-13 and 602-5 is shown in Table 3 along with the cost metrics assigned to each node. In other words, optical paths F, G, H are diverse except for having the same endpoints. In this example, relative cost is computed and a price component can be calculated, where optical path F has a cost of 15, optical path G has a cost of 18, and optical path H has a cost of 10. The price component may be guided by actual providers' costs associated with the congestion and overbuild to alleviate the congestion. It is noted that a final choice by a customer for a given path may depend upon price, latency, physical redundancy, among other factors.

TABLE 3

Paths F, G, H in WDM system 600

| Path F/Cost | Path G/Cost | Path H/Cost |
|-------------|-------------|-------------|
| 602-13/2    | 602-13/2    | 602-13/2    |
| 602-12/1    | 602-22/4    | 602-14/1    |
| 602-11/2    | 602-1/6     | 602-2/2     |
| 602-10/1    | 602-17/4    | 602-3/1     |
| 602-9/2     | 602-5/2     | 602-4/2     |
| 608-8/2     |             | 602-5/2     |
| 602-7/1     |             |             |
| 602-6/2     |             |             |
| 602-5/2     |             |             |
| TOTAL/15    | TOTAL/18    | TOTAL/10    |

In a further example, WDM system 600 may be used to monitor exhaustion of credit values and accordingly to monitor network usage over time. In this manner, a heat map showing hot spots of credit value exhaustion may be used in an analysis of how WDM system 600 can be adapted or expanded over time to optically satisfy network demand. For example, WDM system 600 may show that that optical links 602-22/602-1, 602-19/602-1, and 602-16/602-1 may be operating very close to exhaustion, while optical links 602-17/602-1 and 602-5/602-17 are exhausted (no more credit values available). If such a heat map is observed to occur often over time, the economic viability of adding a new direct optical link 602-5/602-1 may be demonstrated as a possible network solution. Other solutions that may be indicated include replacing amplifiers with higher quality amplifiers, replacing fibers with improved fiber, among others. Thus, WDM system 600 may be used to show where physical changes in the optical network are economically justified based on traffic congestion.

Figure 7:
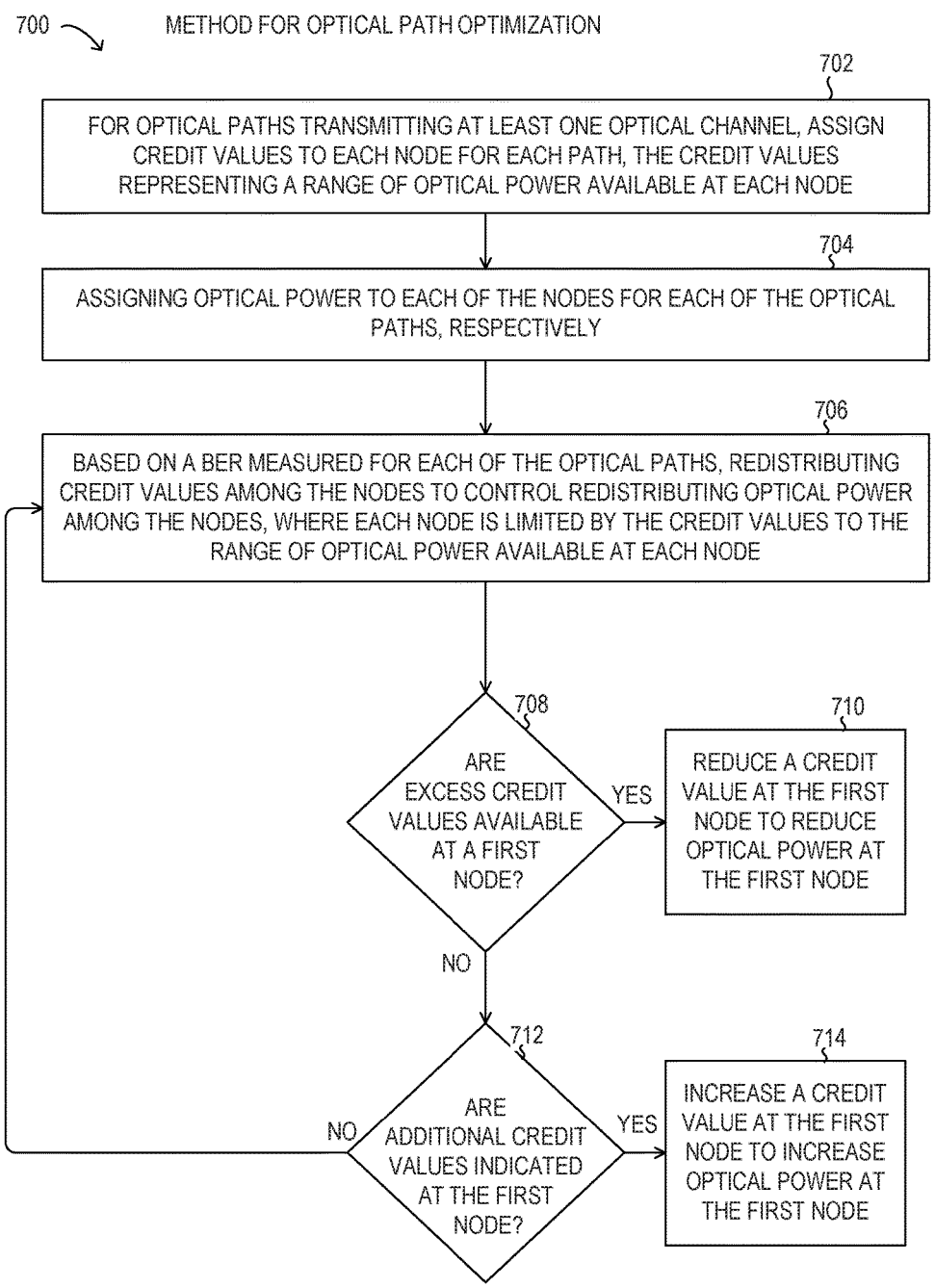
FIG. 7 is a flowchart of selected elements of an embodiment of a method for path optimization in optical networks.

Referring now to FIG. 7, method 700 for optical path optimization is shown in flowchart form. As shown method 700 may be performed for optical transport network 101 (see FIG. 1) using control system 200 or SDN controller 300 or both, in particular embodiments, among others. It is noted that operations described with respect to method 700 may be omitted or rearranged in different embodiments.

For optical paths transmitting at least one optical channel, method 700 may begin at step 702 by assigning credit values to each node for each path, the credit values representing a range of optical power available at each node. Step 702 corresponds to the creation and distribution of credit values on a per node basis. At step 704, optical power is assigned to each of the nodes for each of the optical paths, respectively. In step 704, credit values may be assigned to each node as an initial optical power setting, for example, nominal optical power. Based on a measured BER for each of the optical paths, at step 706, credit values are redistributed among the nodes to control redistributing optical power among the nodes, where each node is limited by the credit values to the range of optical power available at each node. It is noted that another data quality metric than BER may be used in step 706, such as OSNR or Q-factor. At step 708, a decision may be made whether excess credit values are available at a first node. In step 708, excess credit values may be available when the optical power setting at the first node can be reduced. When the result of step 708 is YES and excess credit values are available at the first node, at step 710, a credit value is reduced at the first node to reduce optical power at the first node. When the result of step 708 is NO, at step 712 a decision is made whether additional credit values are indicated at the first node. In step 712, additional credit values may be indicated at the first node when the optical power setting at the first node is lower than a desirable optical power setting for the first node. When the result of step 712 is YES and additional credit values are indicated at the first node, at step 714, a credit value is increased at the first node to increase optical power at the first node. When the result of step 712 is NO, method 700 may loop back to step 706.

Figure 8:
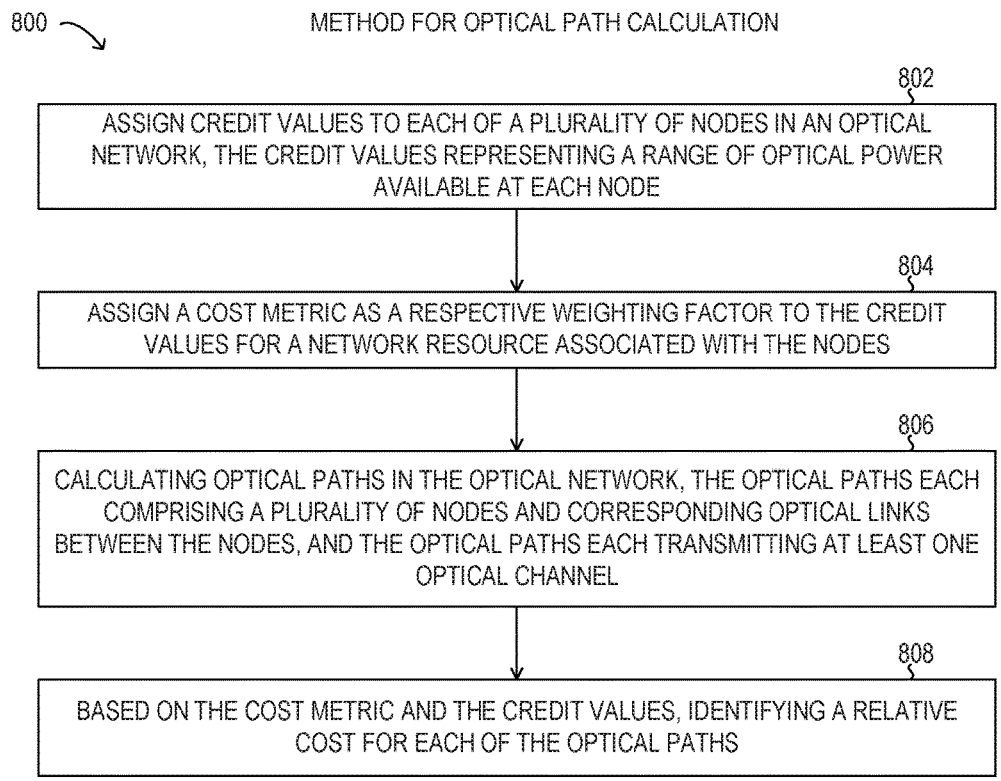
FIG. 8 is a flowchart of selected elements of an embodiment of a method for path computation in optical networks.

Referring now to FIG. 8, method 800 for optical path calculation is shown in flowchart form. As shown method 800 may be performed for optical transport network 101 (see FIG. 1) using control system 200 or SDN controller 300 or both, in particular embodiments, among others. It is noted that operations described with respect to method 800 may be omitted or rearranged in different embodiments.

Method 800 may begin at step 802, by assigning credit values to each of a plurality of nodes in an optical network, the credit values representing a range of optical power available at each node. At step 802, a cost metric is assigned as a respective weighting factor to the credit values for a network resource associated with the nodes. At step 806, optical paths are calculated in the optical network, the optical paths each comprising a plurality of nodes and corresponding optical links between the nodes, and the optical paths each transmitting at least one optical channel. Based on the cost metric and the credit values, at step 808, a relative cost is identified for each of the optical paths. In or after step 808, a lowest cost path, based on the relative cost identified, may be selected.

As disclosed herein, methods and systems may implement a credit based approach for optimizing optical transmission and calculating optical paths in optical networks.

While the subject of this specification has been described in connection with one or more exemplary embodiments, it is not intended to limit any claims to the particular forms set forth. On the contrary, any claims directed to the present disclosure are intended to cover such alternatives, modifications and equivalents as may be included within their spirit and scope.

What is claimed is:

1. A method for path optimization in optical networks, the method comprising:
for a plurality of optical paths in an optical network, the optical paths each comprising a plurality of nodes and corresponding optical links between the nodes, and the optical paths each transmitting at least one optical channel, assigning credit values to each of the nodes for each of the optical paths, respectively, the credit values representing a range of optical power available at each node for each optical channel, respectively;
assigning an initial optical power to each of the nodes for each of the optical channels, respectively; and
based on a bit error rate (BER) measured for each of the optical channels, redistributing credit values among the nodes to control redistributing optical power among the nodes, wherein each node is limited by the credit values to the range of optical power available at each node, and further comprising:
when excess credit values are available at a first node of the nodes, reducing a credit value at the first node to reduce the optical power applied at the first node; and
when additional credit values are indicated at the first node, increasing a credit value at the first node to increase the optical power applied at the first node.

2. The method of claim 1, wherein redistributing credit values among the nodes is performed for respective nodes transmitting at least two different optical paths to redistribute power among the different optical paths.

3. The method of claim 1, wherein redistributing credit values among the nodes is performed for nodes along a first optical path to redistribute power among the nodes in the first optical path.

4. The method of claim 1, wherein redistributing credit values among the nodes is performed for a first transmission direction along the optical paths independently of a second transmission direction opposing the first transmission direction.

5. The method of claim 1, wherein an availability of excess credit values at the first node is determined by:
a current credit value at the first node relative to the range of optical power;
and an indication of additional credit values at the first node is determined by:
the BER of the optical paths transmitted by the first node relative to a BER threshold value.

6. The method of claim 1, further comprising, at each of the nodes, for each optical path transmitted by the node:
monitoring the credit values assigned to the node with respect to the range of credit values;
responsive to a request to redistribute credit values associated with the node, modifying the optical power applied at the first node according to the request; and
after modifying the optical power, reporting the credit value at the node.

7. The method of claim 1, wherein redistributing the credit values further comprises:
monitoring the BER for each optical path in the network;
based on the BER for the optical path, sending at least one request to redistribute credits to nodes associated with the optical path; and
receiving reports of current credit values at each of the nodes for each of the optical paths.

8. The method of claim 1, wherein the credit values further comprise a cost metric as a weighting factor for a network resource associated with the nodes, wherein the network resource is selected from at least one of:
a data transmission capacity of a node;
a channel capacity of a node;
a cost per mile associated with a node;
a network demand associated with a node at a given time;
a number of optical links available to a node; and
a network latency associated with a node.

9. The method of claim 8, further comprising in the optical network:
generating the cost metric for the network resource based on a market value for the network resource.

10. The method of claim 1, wherein the nodes are wavelength division multiplexing nodes.

11. A network management system for path optimization in optical networks, the network management system comprising:
a processor enabled to access a memory media storing instructions executable by the processor to:
for a plurality of optical paths in an optical network, the optical paths each comprising a plurality of nodes and corresponding optical links between the nodes, and the optical paths each transmitting at least one optical channel, assign credit values to each of the nodes for each of the optical paths, respectively, the credit values representing a range of optical power available at each node for each optical channel, respectively;
assign an initial optical power to each of the nodes for each of the optical paths, respectively; and
based on a bit error rate (BER) measured for each of the optical channels, redistribute credit values among the nodes to control redistributing optical power among the nodes, wherein each node is limited by the credit values to the range of optical power available at each node, and further comprising instructions to:
when excess credit values are available at a first node of the nodes, reduce credit values at the first node to reduce the optical power applied at the first node; and
when additional credit values are indicated at the first node, increase credit values at the first node to increase the optical power applied at the first node.

12. The network management system of claim 11, wherein the instructions to redistribute credit values among the nodes are executed for respective nodes transmitting at least two different optical paths to redistribute power among the different optical paths.

13. The network management system of claim 11, wherein the instructions to redistribute credit values among the nodes are executed for nodes along a first optical path to redistribute power among the nodes in the first optical path.

14. The network management system of claim 11, wherein the instructions to redistribute credit values among the nodes are executed for a first transmission direction along the optical paths independently of a second transmission direction opposing the first transmission direction.

15. The network management system of claim 11, wherein an availability of excess credit values at the first node is determined by:

a current credit value at the first node relative to the range of optical power;
and an indication of additional credit values at the first node is determined by:
the BER of the optical paths transmitted by the first node relative to a BER threshold value.

16. The network management system of claim 11, wherein each of the nodes, for each optical path transmitted by the node, is enabled to:
monitor the credit values assigned to the node with respect to the range of credit values;
responsive to a request to redistribute credit values associated with the node, modify the optical power applied at the first node according to the request; and
after modifying the optical power, report the credit value at the node.

17. The network management system of claim 11, wherein the instructions to redistribute credit values further comprise instructions to:
monitor the BER for each optical path in the network;
based on the BER for the optical path, send at least one request to redistribute credit values to nodes associated with the optical path; and
receive reports of current credit values at each of the nodes for each of the optical paths.

18. The network management system of claim 11, wherein the credit values further comprise a cost metric as a weighting factor for a network resource associated with the nodes, wherein the network resource is selected from at least one of:
a data transmission capacity of a node;
a channel capacity of a node;
a cost per mile associated with a node;
a network demand associated with a node at a given time;
a number of optical links available to a node; and
a network latency associated with a node.

19. The network management system of claim 18, further comprising instructions to:
generate the cost metric for the network resource based on a market value for the network resource.

20. The network management system of claim 11, wherein the nodes are wavelength division multiplexing nodes.

* * * * *